United States Patent [19]

Heanley et al.

[11] Patent Number: 5,256,855
[45] Date of Patent: Oct. 26, 1993

[54] SILICA PRODUCTION

[75] Inventors: Charles P. Heanley; John K. Williams, both of Faringdon, United Kingdom; Takumi Fukunishi, Sagamihara; Takao Matsuoka, Tokyo, both of Japan

[73] Assignees: Tetronics Research & Development Co. Ltd., Faringdon, United Kingdom; Nippon Silica Glass Co., Ltd., Tokyo, Japan

[21] Appl. No.: 859,001

[22] Filed: Mar. 30, 1992

[30] Foreign Application Priority Data

Apr. 25, 1991 [GB] United Kingdom ............... 9108891

[51] Int. Cl.$^5$ ............................................. B23K 9/00
[52] U.S. Cl. ......................... 219/121.59; 219/121.38; 219/121.52; 219/121.48; 423/335
[58] Field of Search ............... 219/121.59, 121.43, 219/121.52, 121.48, 121.38, 76.16, 121.47, 121.49; 427/34, 38; 423/335, 337

[56] References Cited

U.S. PATENT DOCUMENTS

| 3,899,573 | 8/1975 | Shaw et al. |
| 3,989,512 | 11/1976 | Sayce |
| 4,048,348 | 9/1977 | Bailey et al. |
| 4,481,636 | 11/1984 | Curr et al. |

FOREIGN PATENT DOCUMENTS

| 419157 | 12/1910 | France |
| 2220475 | 10/1974 | France |
| 2313327 | 12/1976 | France |
| 2446264 | 8/1980 | France |
| 1205576 | 9/1970 | United Kingdom |

Primary Examiner—Mark H. Paschall
Attorney, Agent, or Firm—Beveridge, DeGrandi, Weilacher & Young

[57] ABSTRACT

Method for the production of fused silica in which a particulate silica feedstock material is passed from a silica feed tube through or near a plasma arc coupling zone in which at least two plasma arcs of opposite polarity are coupled, thereby raising the temperature of the feedstock material and collecting the material as fused silica.

11 Claims, 3 Drawing Sheets

SILICA PRODUCTION

The present invention relates to a process for the production of fused silica and, in particular, to a process for the production of very pure fused silica containing a controlled proportion of hydroxyl groups therein.

Fused silica is used in various apparatuses and equipment, where its high melting point, ability to withstand large and rapid temperature changes, chemical inertness and transparency (including transparency to UV and IR radiation), and low dielectric constant are valuable.

High purity fused silica is currently produced by several techniques:

(a) The fusion of a silica feed material using an oxygen-hydrogen flame. This technique introduces hydroxyl groups into the fused silica at levels typically of about 200 ppm. Furthermore, the high gas volume makes processing control critical in order to maximize the yield of fused silica and to ensure relatively minimal pick up of hydroxyl groups.

(b) The impingement of silicon tetrachloride, oxygen and hydrogen onto the surface of a growing fused silica ingot. This technique is expensive and requires a source of silicon tetrachloride as a feed material. However, it is currently used to produce the purest fused silica glasses. This route introduces hydroxyl groups into the fused silica.

(c) Radio frequency plasma fusion. This technique uses radio frequencies to excite a gas and impinge the resulting plasma onto a growing fused silica ingot at a maximum rate of about 1 Kg per hour; Only small ingots of fused silica, a few inches in diameter, have been produced using this technique. The efficiency of the process is poor and the technique expensive.

(d) By heating a silica feed material in a vacuum such as $10^{-1}$ Torr by a variety of heating methods such as radiantly from various metals such as Tungsten and Molybdenum themselves being resistively heated or radiantly from graphite itself heated by inductive means.

All these methods have limitations.

Methods using oxyhydrogen flames as in (a) and (b) above are unable to make hydroxyl free fused silica.

The radio frequency plasma fusion method (R.F.) (c) and the vacuum methods (d) have the disadvantage of slow production rates, expensive equipment and high operating costs.

The R.F. method has the additional disadvantages of producing electrical interference in surrounding equipment.

Arc plasmas have been considered for making fused silica but have not been used for production because non-transferred arc systems have had too high flame velocities with too much gas, and transferred systems require a return electrode which is not compatible with the purity or conductivity of the silica.

We have now developed a process for the preparation of very pure fused silica in which the proportion of hydroxyl groups can be controlled.

Our process is based on the use of our twin torch plasma system which has the merits of both transferred and non-transferred arc plasmas in as much as the gas flows are low and gentle and there is no product contaminating return electrode connection.

Our process can make hydroxyl free fused silica but without the expense and production rate limitations of the RF and vacuum methods. Production rates of up to 10 kg per hour are possible.

The arrangement of the torches and arcs lends itself conveniently to the use of an adjustable feed tube made of quartz to direct the feed between the twin torches to the preferred position with respect to the fused silica being produced.

Accordingly, the present invention provides a process for the production of fused silica which process comprises passing a particulate silica feedstock material through or near a plasma arc coupling zone in which at least two plasma arcs of opposite polarity are coupled, thereby raising the temperature of the feedstock material, and collecting the material as fused silica.

The plasma arcs are usually generated by a system comprising at least two plasma electrodes of opposite polarity, one electrode acting as the cathode and one electrode acting as the anode. A plurality of electrodes of opposite polarity may also be used, if desired. During the passage of the particulate feedstock through or near the coupling zone, and while it lies on the surface of the ingot, the temperature of the feedstock is raised and, the particles fuse together.

Silica feedstock materials which may be treated in accordance with the process of the invention include silica sand, amorphous silica, quartz, quartz sand or crystobalite. The particulate feedstock material preferably has a particle size in the range of from 70 to 500 micrometers.

The plasma electrodes are preferably inclined at an angle to one another, preferably in a symmetrical disposition to the flow of particulate material. A wide range of electrode angles are possible ranging from the torches being parallel to each other to pointing at each other. For optimum temperature pick up by the particulate material, it is preferred to have the electrodes pointing downstream with the angle between the electrodes being in the range of from 80° to 130°, i.e. the electrodes being at an angle of from 40° to 65° to the vertical.

The electrode tips may be in close proximity to the stream of particulate material or they may be widely spaced, depending upon the electrode sizing and input power.

Whilst all gases can be ionized to form a plasma, preferred gases for use are He, Ne, Ar and $N_2$, or mixtures or combinations thereof, with argon and nitrogen being the most preferred gases for use.

Using the arrangement of plasma electrodes described above, it will be apparent that there is no requirement for a non-plasma torch return electrical connection, as the conductive path is via the plasma gases through the surrounding gaseous medium. Accordingly, there are no contamination problems using the process of the invention.

In carrying out the process of the present invention the silica preferably falls onto a movable platform. The platform may be rotatable about its vertical axis and/or moveable in the vertical direction so that the distance from the plasma arcs to the platform may be adjusted. Thus, as a fused silica ingot is formed on the platform the platform may be moved away from the plasma arcs so that the distance from the plasma arcs to the point where the silica falls onto the fused silica ingot remains substantially constant. It is advantageous to rotate the platform during the condensation so that the silica falls evenly over the surface of the ingot.

The fused silica which is produced by the process of the invention is of high purity, the limit of purity depending on the plasma gas and feedstock purity and, to a lesser extent, on the possibility of pick-up of impurities form the electrode materials. The reduction in the hydroxyl group content of the fused silica reduces the absorption thereof, particularly in IR radiation. The use of nitrogen as a plasma gas or the operation of the process in a nitrogen atmosphere may result in the presence of nitrogen in the fused silica which increases the hardness of the silica and the viscosity of the silica at high temperatures. The high temperatures reached by the plasma arcs may allow alkali metal impurities to be at least partially removed, thereby improving the electrical properties and decreasing the vitrification tendency.

The present invention also includes within its scope as apparatus for the production of fused silica which comprises:
(i) at least one anodic plasma arc electrode and at least one cathodic plasma arc electrode, the electrodes being arranged in such a manner that the plasma arcs produced when the electrodes are in use coupled together in a coupling zone;
(ii) means for feeding a feedstock comprising particulate silica into the region between the electrodes or near where the plasma arc coupling zone is formed;
(iii) a platform positioned beneath the plasma arc coupling zone;
(iv) means to rotate the platform about its vertical axis; and
(v) means to move the platform vertically in an upwards or downwards direction.

The apparatus of the present invention preferably includes means for the adjustment of the angle of inclination of the plasma arc torches, sideways movement of the torches and preferably also the provision of means to cool the moving platform. Preferably the apparatus also includes means to displace the vertical axis of the platform and to introduce gas down the feed tube.

The present invention will be further described with reference to the accompanying drawings, in which.

Figure 1:
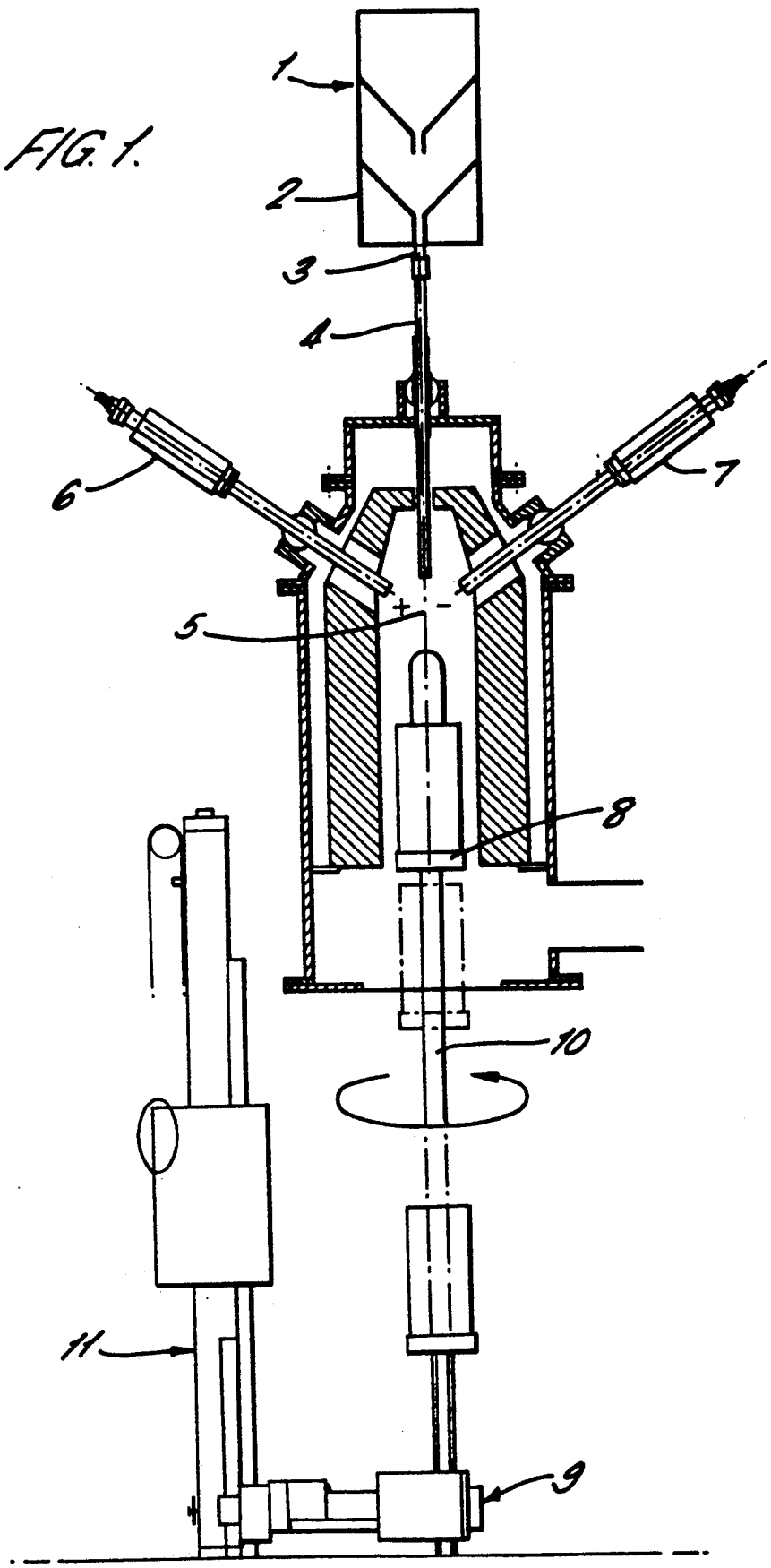
FIG. 1 is a schematic diagram of apparatus for use in the production of fused silica in accordance with the process of the present invention.

Referring to FIG. 1, a hopper 1 is filled with a particulate silica feed material. The hopper 1 is connected to a feeder 2 whereby the feed material passes along the feeder to a funnel. The feed material is then passed down a silica tube 3 and 4 and through or near a plasma arc coupling zone 5. The plasma arcs are produced by a plasma anode torch 6 and plasma cathode torch 7. The plasma anode torch 6, which is described below with reference to FIG. 3, preferably has a non-consumable blunt ended electrode which is made from copper or another non-consumable metal. Below zone 5 the silica feedstock material is fused by the heat generated by the plasma arcs. Beneath the plasma arc zone 5 is located a platform 8 which can be rotated about its vertical axis by a drive 9. The platform 8 is connected to a spindle 10 which in turn is connected to a lift mechanism 11 whereby the platform 8 can be raised and lowered, as required. Support legs are provided in order to steady the platform raising and lowering mechanism. Generally the platform will be positioned about 1 to 20 centimeters below the plasma arc coupling zone.

The angle between the anode torch 6 and cathode torch 7 is generally in the range of from 80° to 130° and the anode and cathode torches are aligned with each other.

The torches can be positioned by moving either or both forwards and backwards, by raising them up or lowering them or by changing their angular positions. The feed tube position can also be altered from side to side and up and down.

The platform 8 with the growing fused silica ingot can be rotated at speeds in the range of from 1 to 60 revolutions per minute.

Figure 2:
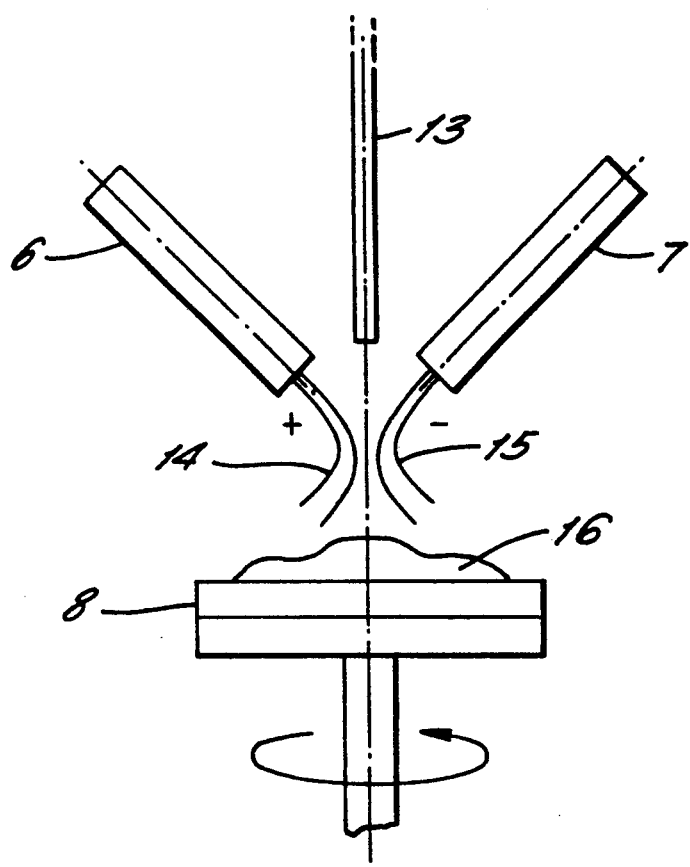
FIG. 2 is a sketch view of the growth of a fused silica ingot.

As best shown in FIG. 2, the stream 13 of feedstock material which issues from the silica tube feed 4 shown in FIG. 1 enters or passes nearby the region where the plasma arc 14 produced by plasma torch 6 and plasma arc 15 produced by plasma torch 7 couple. The material then continues to travel downwardly and impinges upon platform 8 which is rotated. As shown in sketch form in FIG. 2, a fused silica ingot 16 is formed on platform 8.

As the silica ingot 16 grows, the platform 8 is moved in a downwardly direction by means of the mechanism as shown in FIG. 1 so as to maintain the distance from the zone in which the plasma arcs 14 and 15 couple to the top surface of the fused silica ingot substantially constant. The speed at which the platform 8 moves may be in the range of from 0.1 to 5 centimeters per minute.

The current to the plasma arc torches 6 and 7 may conveniently be in the range of from 100 to 600 amps at a voltage of 50 to 250 volts. The gas flows through both the anode plasma torch 6 and the cathode plasma torch 7 may conveniently be in the range of from 10 to 60 liters per minute. The feed rate for the silica feed stock material may conveniently be in the range of from 1 to 20 kilograms per hour.

Figure 3:
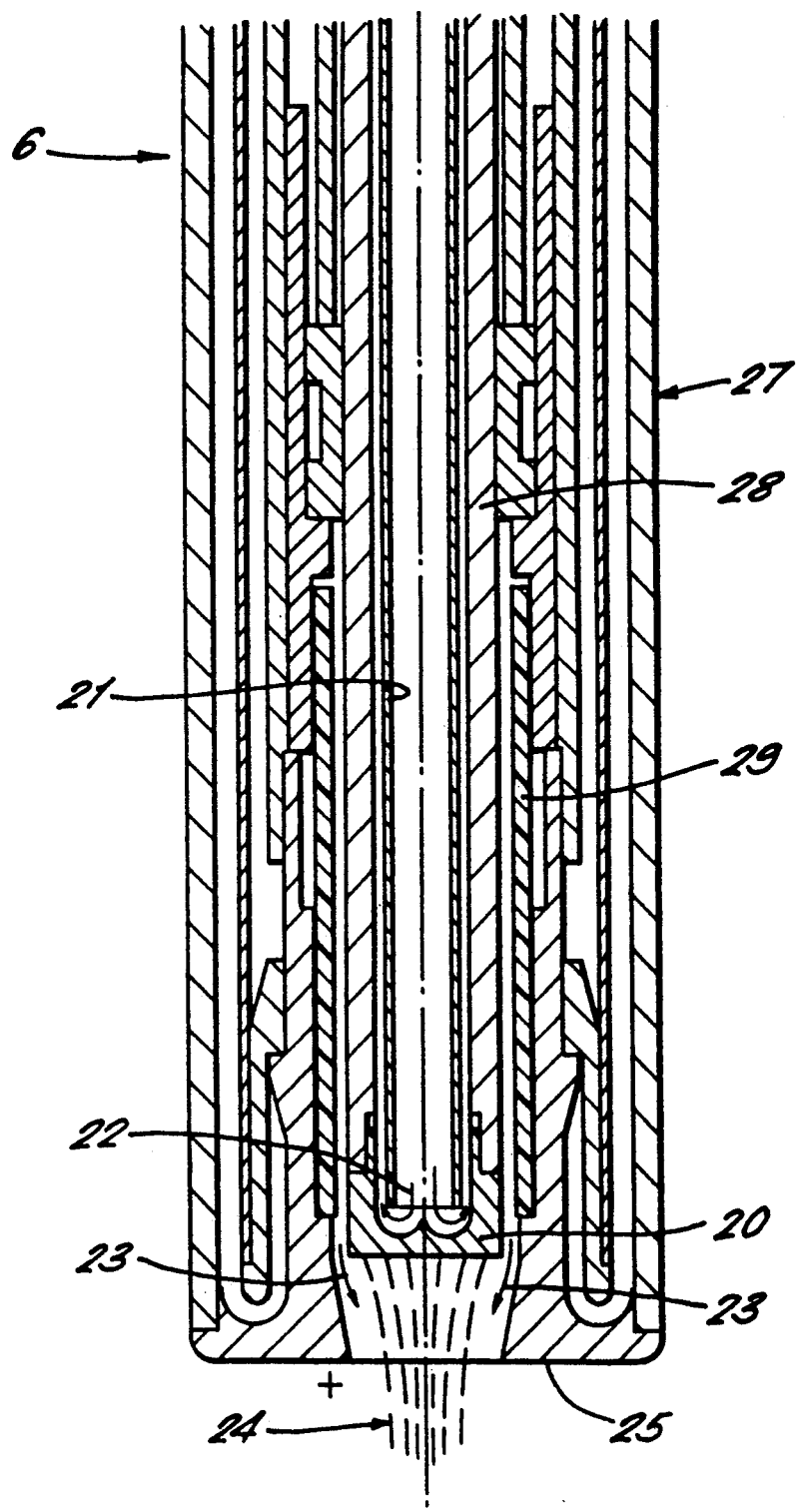
FIG. 3 is a section through the tip of a plasma anode torch for use in the present invention.

Referring to FIG. 3, a plasma anode torch for use in the present invention is generally shown at 6. The anode torch has a non-consumable blunt ended electrode 20 which is made from copper or another non-consumable metal. The electrode 20 has a concentric tube 21 formed therein. Cooling water is passed down tube 21, through the space between the end of the tube 21 and the interior surface of the tip of electrode 20 in the direction as shown by the arrows 22.

A plasma gas flows around the tip of the electrode in the direction of the arrows 23 and a plasma arc is formed at 24, the plasma arc then emanating from the the nozzle 25 of the plasma arc torch. The nozzle assembly 27 is water cooled, and serves to confine the plasma gas around the electrode 20. The nozzle 25 is electrically isolated from the electrode assembly 28 by an insulator 29. The blunt end gives a widely based arc root allowing a high current carrying capacity and very long component life and very little wear and hence very low contamination of a product stream or product ingot.

The anode, plasma torch as described with reference to FIG. 3 is believed to be novel and thus constitutes a still further aspect of the present invention. Anode torches which have previously been described have a hollow cylindrical shape with the arc root springing from the inside of the cylinder and being forced to move around the inside surface of the cylinder by swirling gas and/or rotating magnetic fields. The anode of the present invention has a blunt surface, of small area, with no arc moving means and a low gas flow.

EXAMPLE 1

Using a version of the apparatus as illustrated in FIGS. 1 and 2 contained in an appropriate housing, various tests were run and the samples obtained were inspected and compared with those of a standard fused silica product having regard to the optical, physical and chemical properties thereof.

The results for 6 runs are given in Table 1 below where the products so obtained are compared to a standard control product.

TABLE 1

| | | Sample No. | | | | | | |
|---|---|---|---|---|---|---|---|---|
| | | 1 | 2 | 3 | 4 | 5 | 6 | Control |
| TEST COND | Plasma Gas +/− | Ar/Ar | Ar/Ar | Ar/Ar | Ar/N$_2$ | Ar/Ar | Ar/ArN$_2$ | — |
| | Gas Flow Rate +/− l/min | 25/20 | 25/20 | 25/20 | 25/25 | 25/25 | 25/13 | — |
| | Power Amp/Volt | 250/100 | 350/100 | 240/100 | 237/130 | 570/210 | 520/230 | — |
| | Feed Rate Kg/hr | 1.4 | 1.8 | 1.5 | 1.5 | 2.5 | 4.5 | — |
| Optical Properties | OH content (ppm) | n.d. | 23.2 | 3.3 | n.d. | 1 | 3 | 146 |
| | Transmission (% T) Thickness: 1.5 mm | | | | | | | |
| | at 300 nm | 92 | 93 | 91 | 92 | 92 | 92 | 93 |
| | at 200 nm | 68 | 68 | 66 | 68 | 69 | 70 | 70 |
| Physical Properties | X-ray diffraction | no crystal phase | — | — | no crystal phase | — | — | no crystal phase |
| | High Temp Viscosity log η | | | | | | | |
| | at 1200° C. | 13.2 | — | 13.2 | — | 13.6 | 13.6 | 12.6 |
| | at 1210° C. | (1210° C.) | | (1210° C.) | | (1200° C.) | (1200° C.) | (1210° C.) |
| Chemical Impurities | Cu (ppm) | <0.01 | <0.01 | <0.01 | <0.01 | <0.01 | <0.01 | <0.01 |
| | W (ppm) | <0.01 | <0.01 | <0.01 | <0.01 | <0.01 | <0.01 | <0.01 |
| | Na (ppm) | 0.42 | 0.9 | 0.74 | 0.65 | 0.5 | 0.53 | 0.33 |
| | N (ppm) | 60 | — | — | 70 | — | — | 70 | n.d. = not detectable

It can be seen from the Table that the test product samples had levels of hydroxyl groups which varied from being not detectable to 23 ppm of hydroxyl groups. The control sample, on the other hand, contained 146 ppm of hydroxyl groups. It can furthermore be seen from Table 1 that the transmission properties and level of impurities in the test samples of the invention are very similar to those of the control product. On the other hand, it can be seen that the viscosity at high temperature is increased against the control sample. It can be seen from the data on the analysis for chemical impurities that there is very little contamination from the electrode torch materials, namely copper and tungsten.

It is difficult to make a clear distinction between the very small nitrogen content in the fused silica of the test samples and that of the control sample because of the uncertainly of the existing techniques of quantitative microanalysis.

Using the process of the present invention fused silica can be produced, which has a hydroxyl group content of less than 25 ppm.

We claim:

1. A method for the production of fused silica which method comprises passing a particulate silica feedstock material from a silica feed tube through or near a plasma arc coupling zone in which at least two plasma arcs of opposite polarity are disposed, each torch having two electrodes, at least one torch acting anodically and at least one torch acting cathodically, the plasma arc torches forming plasma arcs of opposite polarity which are coupled in the plasma arc coupling zone, thereby raising the temperature of the feedstock material and collecting the material as fused silica.

2. A method according to claim 1 wherein the plasma torches are inclined at an angle to the vertical.

3. A method according to claim 2 wherein the plasma torches are symmetrically disposed, each being at an angle of 40° to 65° to the vertical.

4. A method according to claim 1 wherein the plasma arcs are formed using a gas selected from the group consisting of argon, helium, neon and nitrogen.

5. A method according to claim 1 wherein the feedstock material is selected from the group consisting of silica sand, amorphous silica, quartz, quartz sand and cristobalite.

6. A method according to claim 1 wherein the particulate feedstock has a particle size in the range of from 70 to 500 micrometers.

7. A method according to claim 1 wherein material selected from the group consisting of solid, molten and vaporous material is collected onto a moveable platform.

8. A method according to claim 7 wherein the platform is rotatable about its vertical axis.

9. A method according to claim 7 wherein the platform is moveable in the vertical direction whereby the distance from the plasma arcs to the platform may be adjusted.

10. A method according to claim 1 wherein the plasma arcs are generated using a direct current supply.

11. A method according to claim 1 wherein the plasma arcs are formed using at least one gas selected from the group consisting of argon, helium, neon and nitrogen.

* * * * *